US009347339B2

(12) United States Patent
Durmaz et al.

(10) Patent No.: US 9,347,339 B2
(45) Date of Patent: May 24, 2016

(54) SYSTEM AND METHOD FOR CONVERTING HEAT ENERGY INTO ELECTRICAL ENERGY THROUGH AND ORGANIC RANKINE CYCLE (ORC) SYSTEM

(75) Inventors: Ahmet Durmaz, Roanoke, VA (US); Marcelo Andres Lara, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 99 days.

(21) Appl. No.: 13/512,066

(22) PCT Filed: Jan. 26, 2010

(86) PCT No.: PCT/US2010/022026
§ 371 (c)(1),
(2), (4) Date: May 25, 2012

(87) PCT Pub. No.: WO2011/093850
PCT Pub. Date: Aug. 4, 2011

(65) Prior Publication Data
US 2012/0261090 A1    Oct. 18, 2012

(51) Int. Cl.
*F01K 13/02* (2006.01)
*F01K 23/10* (2006.01)
*F01K 25/08* (2006.01)
*F23J 15/06* (2006.01)

(52) U.S. Cl.
CPC .............. *F01K 25/08* (2013.01); *F01K 13/02* (2013.01); *F01K 23/10* (2013.01); *F23J 15/06* (2013.01); *Y02B 30/746* (2013.01); *Y02E 20/363* (2013.01)

(58) Field of Classification Search
CPC ................ F01K 23/10–23/108; F01K 17/025

USPC .......... 60/645–681, 306, 604, 614–618, 685, 60/686, 690, 694, 695; 110/234
See application file for complete search history.

(56) References Cited

U.S. PATENT DOCUMENTS 4,055,948 A * 11/1977 Kraus et al. .................. 60/641.8
4,083,398 A    4/1978 Fallon, Jr. et al.
(Continued)

FOREIGN PATENT DOCUMENTS

CN           1121559       5/1996
WO       2009112916 A2    9/2009

OTHER PUBLICATIONS

International Application No. PCT/US10/022026, International Preliminary Report on Patentability, Jul. 31, 2011.
(Continued)

*Primary Examiner* — Thomas Denion
*Assistant Examiner* — Laert Dounis
(74) *Attorney, Agent, or Firm* — New River Valley IP Law, P.C.; Michele L. Mayberry

(57) ABSTRACT

A system and method for converting otherwise wasted energy produced in the form of heated gases as a byproduct of an industrial process into electrical energy. At least some waste gases are diverted from a typical exhaust structure through a heat exchanger and back into the exhaust structure. The amount of gases flowing through the heat exchanger is monitored and regulated by a controller. A heat source liquid is simultaneously circulated under pressure through the heat exchanger and through an organic Rankine cycle system. The amount of heat source liquid being circulated is also monitored and regulated by the controller. The ORC system converts the heat from the heat source liquid into electricity.

15 Claims, 4 Drawing Sheets

(56) References Cited

U.S. PATENT DOCUMENTS

| | | | |
|---|---|---|---|
| 4,137,965 | A | 2/1979 | Fallon, Jr. et al. |
| 4,333,310 | A * | 6/1982 | Uram .................. 60/39.182 |
| 4,353,206 | A * | 10/1982 | Lee .................. B01D 53/56 |
| | | | 122/7 B |
| 4,422,298 | A | 12/1983 | Nozawa |
| 4,875,436 | A | 10/1989 | Smith et al. |
| 5,133,191 | A * | 7/1992 | Bruhn et al. .................. 60/659 |
| 5,632,143 | A | 5/1997 | Fisher et al. |
| 5,944,090 | A * | 8/1999 | Teal .................. 165/47 |
| 6,571,548 | B1 * | 6/2003 | Bronicki et al. .................. 60/772 |
| 6,581,384 | B1 * | 6/2003 | Benson .................. 60/653 |
| 6,742,337 | B1 | 6/2004 | Hays et al. |
| 6,981,377 | B2 * | 1/2006 | Vaynberg et al. .................. 60/641.8 |
| 7,174,716 | B2 | 2/2007 | Brasz et al. |
| 7,340,897 | B2 | 3/2008 | Zimron et al. |
| 2005/0171736 | A1 * | 8/2005 | Kang .................. 702/185 |
| 2005/0183421 | A1 | 8/2005 | Vaynberg et al. |
| 2006/0236698 | A1 | 10/2006 | Langson |
| 2008/0289313 | A1 * | 11/2008 | Batscha et al. .................. 60/39.5 |
| 2009/0277400 | A1 | 11/2009 | Conry |

OTHER PUBLICATIONS

International Application No. PCT/US10/022026, International Search Report, Apr. 1, 2010.
International Application No. PCT/US10/022026, Written Opinion, Apr. 1, 2010.
TransPacific Energy Inc. website printout of "Organic Rankine Cycle" (http://www.transpacenergy.com), 3 pages, copyright 2009.
Co-Pending Application CN 201080060256.1, First Office Action dated Jun. 25, 2014, with English language version, 18 pages.
Co-Pending Application CN 201080060256.1, Response to First Office Action filed Jan. 8, 2015 and English Version, 22 pages.
Co-Pending Application CN 201080060256.1, Second Office Action, with English Translation, dated Apr. 21, 2015, 13 pages.
Co-Pending Application CN 201080060256.1, Response to Second Office Action, with English Version, filed Sep. 7, 2015, 19 pages.
Co-Pending Application CN 201080060256.1, Response to Third Office Action and English Version of Response, filed Mar. 9, 2016, 23 pages.
Co-Pending Application CN 201080060256.1, Third Office Action dated Dec. 25, 2015 with Translation, 6 pages.

* cited by examiner

SYSTEM AND METHOD FOR CONVERTING HEAT ENERGY INTO ELECTRICAL ENERGY THROUGH AND ORGANIC RANKINE CYCLE (ORC) SYSTEM

TECHNICAL FIELD

The subject invention relates generally to an economical means for the conversion of otherwise wasted heat energy produced by industrial furnaces into electrical energy. More particularly, a system and method are disclosed for increasing the efficiency of a steel mill plant by recovering part of the wasted heat energy and transforming it into electrical energy that can be reused inside the same plant.

BACKGROUND OF THE INVENTION

Steel mills incorporate different types of furnaces. Slab reheating furnaces, annealing furnaces and other type of furnaces are typical in steel mill plants. The furnaces in general have a relatively low efficiency and an important portion of the heat produced as a result of the combustion of gas or other means, can't be transferred to the steel and is finally dissipated into the atmosphere.

Steel mills are major consumers of electrical energy. Most of the power plants in the world use fossil fuels that generate CO2 emissions. Therefore, it is important to reduce the electrical energy consumption to minimize CO2 emissions.

In some furnaces, a recuperator is included in the stack in order to heat the combustion air for the fuel or gas that is used to produce the heat required by the process. In other cases, the heat is used to heat water that is later used to heat buildings. A schematic diagram of a typical such system known in the art is presented in FIG. 1 in which primary exhaust gases 5 from furnace 10 are fed into a recuperator 15 through which incoming air or liquids 20 are cycled so as to transfer and capture heat energy in output air or liquids 25. The remaining secondary exhaust gases 30 are disposed of through stack 35. Even though these systems normally recover a significant amount of heat, some significant portion of the heat is still wasted by releasing hot gases to the atmosphere. The temperature of these exhaust gases remain high enough to warrant efforts to transform that heat energy into electrical energy.

SUMMARY OF THE INVENTION

The invention relates to a system and method for recovering otherwise wasted energy generated in the form of waste gases as a byproduct of an industrial process. Waste gases are produced by a fuel-powered device and these gases are expelled into an exhaust structure. At least a part of these waste gases are diverted into a gas input of a heat exchanger which also includes a gas output, a heat source liquid input and a heat source liquid output. The input of an evaporator of an organic Rankine cycle (ORC) system is connected to the heat source liquid output of the heat exchanger while the output of the ORC is connected to the heat source liquid input of the heat exchanger. The amount of waste gases circulated through the heat exchanger and back into the exhaust structure through the gas output in the gas circuit is regulated by an exhaust fan connected to a first electric motor controlled by a first variable frequency drive (VFD). The amount of heat source liquid circulated through the heat exchanger and an evaporator in the ORC in a heat source liquid circuit is regulated by a pump connected to a second electric motor and a second variable frequency drive (VFD). The heat source liquid incorporates a pressurized expansion tank. A first controller which incorporates a Proportional-Integral regulator monitors the operation of both the gas circuit and the heat source liquid circuit and regulates the amount of gas and liquid, respectively, circulating through each circuit. A second controller connected to the fuel-powered device provides data to the first controller on the fuel consumption rate of the fuel-powered device. The fuel consumption data is used by the first controller to regulate gas and heat source liquid flows. An expander in the ORC is connected to a generator in the ORC and produces electricity which is measured by a transducer.

The invention also relates to a method for regulating the generation of electrical power from heated waste gases emitted from a fuel-powered industrial device using the system described above. The optimum target temperature for the heat source liquid is calculated based on a function having as input variables the temperature feedback of heated gases entering the gas input of the heat exchanger and the device fuel consumption as indicated by the second controller, if such data is available, added to the heat source liquid initial target temperature. Then, a desired speed feed forward command for the first VFD is further calculated based on a function having as input variables the optimal heat source liquid temperature and a target speed reference for the second variable frequency drive. Yet a further calculation is then made of a speed adjustment for the exhaust gases fan based on the measured temperature of the heat source liquid and the proportional and integral gains of the Proportional-Integral regulator incorporated into the first controller. The target speed of the first VFD is then set along with its calculated maximum allowable speed. If the fan speed target exceeds the maximum allowable speed, it is clamped to the maximum allowable speed. Next, the target speed for the second VFD is subsequently calculated based on a function having as input variables the heat source liquid target temperature at the heat source liquid outlet of the heat exchanger and the temperature of the ORC system cooling fluid based on a feedback signal from a temperature sensor. The maximum allowable speed for the second VFD is determined based on a function having as an input variable the power output of the ORC as measured by the transducer. If the maximum allowable speed for the second VFD is exceeded, its target speed is clamped to the allowed level. Until the fuel-powered device is shut down, the method returns to the point where a determination is made whether fuel consumption data is available.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
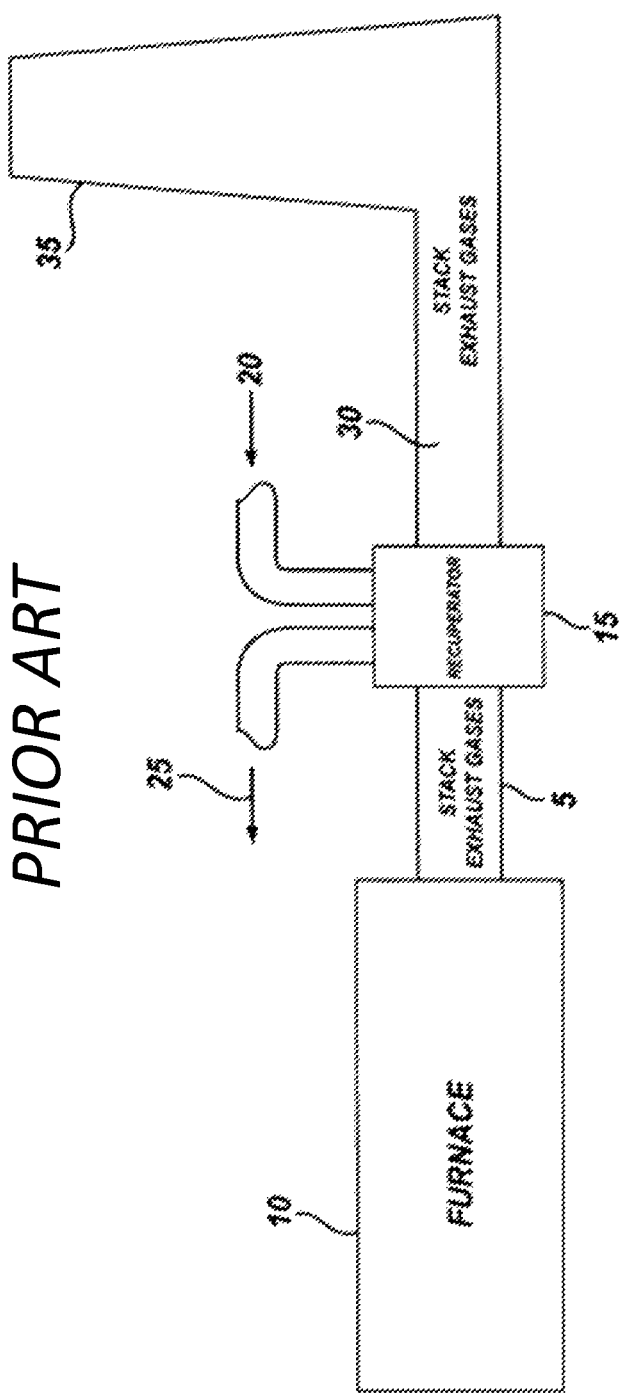
FIG. 1 is a schematic diagram of a gas heat recuperator system known in the art.
Figure 2:
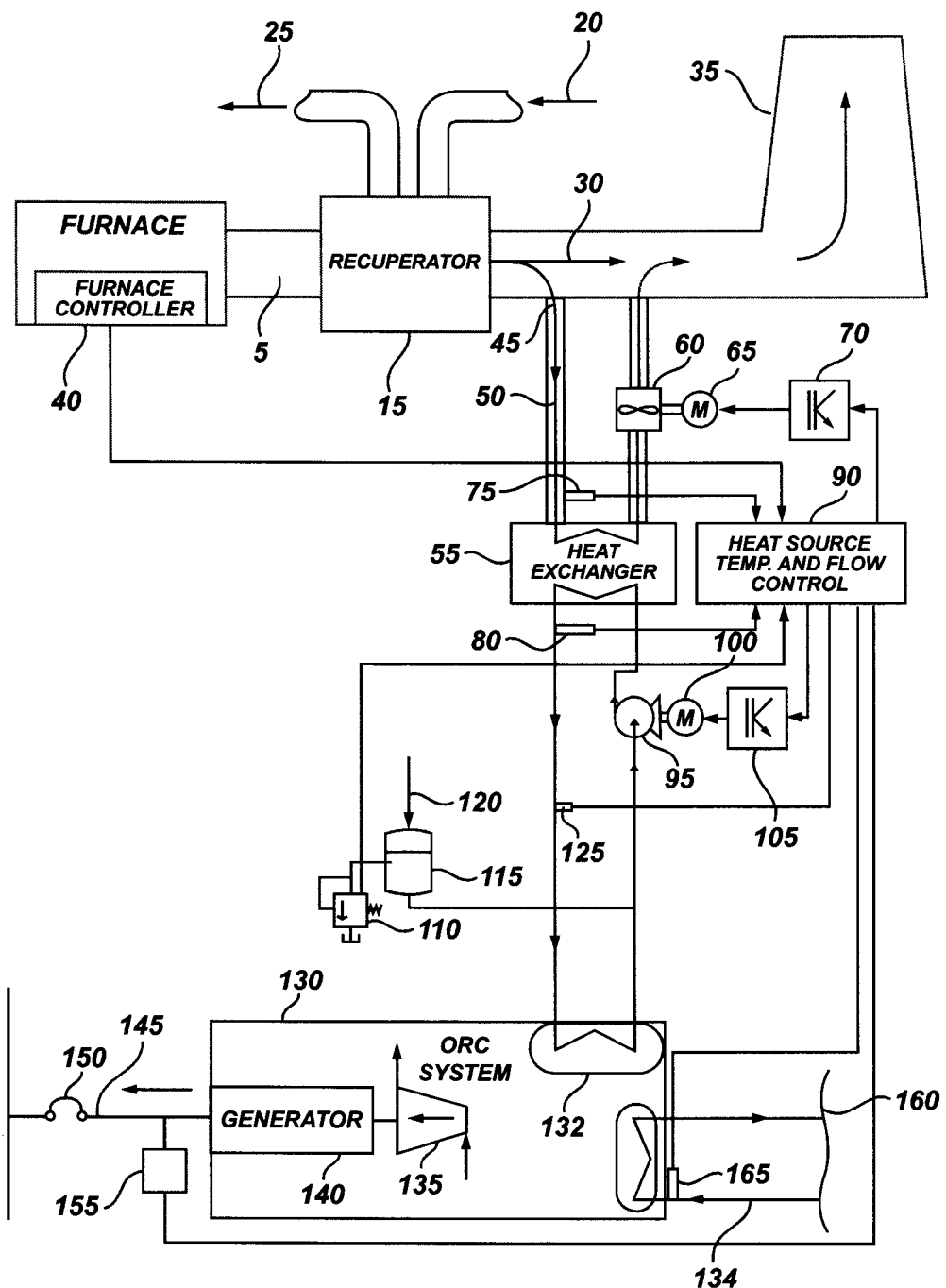
FIG. 2 is a schematic diagram showing the main elements of an industrial energy recovery system.

FIG. 2 illustrates in schematic diagram form the functional elements of the system of this invention. The same elements are present as shown in FIG. 1 but, in addition, furnace controller 40 is required to monitor the operation of furnace 10 and to provide data concerning furnace fuel consumption to controller 90, as discussed below. Tap 45 is added to divert at least a portion of the secondary exhaust gases 30 prior to their evacuation through an exhaust structure such as stack 35 into a tertiary exhaust gas stream 50. Tap 45 feeds tertiary exhaust gas stream 50 into first heat exchanger 55. This heat exchanger is designed based on the temperature range of the exhaust gases, the acceptable temperature range for the heat source liquid, the amount of heat to be transferred to the heat source liquid and the acceptable pressure drop on both circuits that will provide an economic solution based on the cost of the heat exchanger and the energy to be consumed by exhaust gases fan and the heat source liquid circulating pump. The material of the heat exchanger has to be suitable for the chemical composition of the exhaust gases. Tertiary exhaust gas stream 50 is circulated through first heat exchanger 55 by using exhaust gases fan 60 which is driven by first electric motor 65 controlled by first variable frequency drive (VFD) 70. Exhaust gases fan 60 is sized to overcome the pressure drop introduced by first heat exchanger 55 under the maximum capacity (maximum flow) of the system and for the suction of the exhaust gases from stack 35. In case of a shut down, exhaust gases fan 60 is stopped so that the gases stop circulating through first heat exchanger 55. The heat source medium used by heat exchanger 55 is a liquid, such as water, water and glycol mix, thermal oil or equivalent, since these types of fluids have a larger thermal capacity than exhaust gases and allow efficient transfer of heat to Organic Rankine Cycle (ORC) system 130 within its acceptable working temperature range. First temperature sensor and transmitter 75 is located at the input of tertiary exhaust gas stream 50 into first heat exchanger 55 and measures the temperature of entering hot gases. Second temperature sensor and transmitter 80 monitors the temperature of liquid exiting first heat exchanger 55. The temperature data measured by the two sensors is transmitted to controller 90 which may be a commercially available programmable logic controller (PLC) or similar device and is used to regulate the temperature and flow of the heat source liquid by changing the speed target of first VFD 70 which controls first electric motor 65.

The heat source liquid circuit incorporates heat source liquid circulating pump 95 which maintains the proper flow of liquid through ORC system 130 and may be of either a fixed or variable speed type. Second electric motor 100, which may be either a fixed or variable speed electric motor, is coupled to liquid circulating pump 95 and is controlled by second VFD 105 in the case of a variable speed pump. Second VFD 105 is, in turn, regulated by controller 90. This system is properly sized to overcome the maximum pressure drop expected under the maximum possible flow of the heat source fluid. The heat source liquid circuit incorporates heat source liquid expansion tank 115 which is pressurized with inert gas 120 such as is typically available at a steel mill in which this invention may be used and includes pressure relief valve 110 connected to the expansion tank 115. Third sensor 125 is a pressure sensor located in the high temperature side of the heat source circuit and functions to monitor the pressure. Evaporator 132, which is part of ORC system 130, completes the heat source liquid circuit.

Steel plants typically have a plant water supply kept at a controlled temperature for cooling purposes. Part of this water supply 160 can be diverted and incorporated into heat sink circuit 134 which is part of ORC 130. In the event that a variable speed heat source liquid circulation pump 95 is used rather than a fixed speed one, additional temperature sensor and transmitter, such as fourth sensor 165, is required to measure the temperature of the cooling medium. This temperature is required to calculate a reference for second VFD 105 to regulate the speed of heat source liquid circulating pump 95. This additional sensor can be included as a part of the ORC system or added externally. Based on the values of this temperature variable and the heat source liquid target temperature, controller 90 modifies the pump speed reference in order to maintain the maximum possible output power and efficiency of the system. When the temperature of the ORC system 130 cooling media and/or the target temperature for the heat source liquid changes, the system will modify the flow of the heat source liquid in an attempt to maintain the power generated and the ORC efficiency at the maximum possible values.

ORC system 130 used in this invention can be any one of several presently commercially available ORC systems. Expander 135 of such a system is coupled to generator 140 which is itself connected to the steel mill plant electrical distribution system through properly sized electrical feeder 145 and corresponding circuit breaker 150. The electrical power output of ORC system 130 is monitored by electrical active power transducer 155 and the resulting data is transmitted to controller 90. The purpose of power transducer 155 is to function as a protective device. Different protection levels can be set. For example, in case of excessive power being generated by the system, controller 90 can be programmed to reduce the speed of exhaust gases fan 60 in order to reduce the heat transferred or to stop the operation of exhaust gases fan 60 completely under pre-designated circumstances. Some commercially available ORC systems also incorporate a by-pass valve for the heat source fluid as a protection. In the event an upstream electrical interruption occurs, such as through tripping of a circuit breaker, and generator 140 is disconnected from the distribution network, protection would also be required. In this case, active power transducer 155 will indicate zero power and a stop exhaust gases fan 60 sequence will also be initiated. If the liquid pressure exceeds a predetermined certain value, detected by third sensor 125, the target reference of first VFD 70 for exhaust gases fan 60 will be reduced as a measure to slow down the heat transfer that could be contributing to high pressure. In the event of sensing of a predetermined greatly excessive pressure, pressure relief valve 110 will actuate and the corresponding signal will be used to shut down the system, by reducing the speed target of first VFD 70 for exhaust gases fan 60 to zero.

Figure 3:
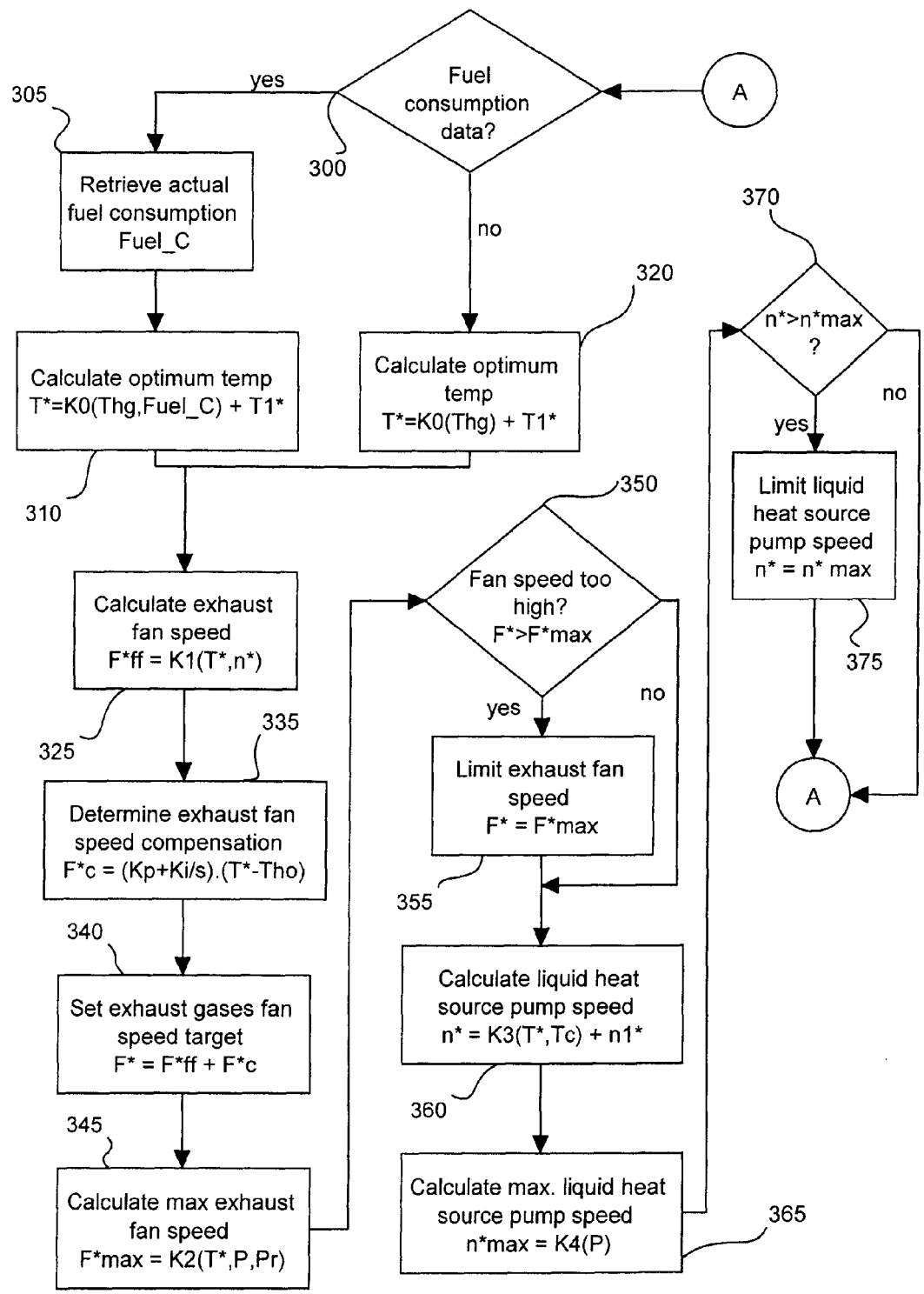
FIG. 3 is a block diagram of the method used to implement the industrial energy recovery system of this invention.

FIG. 3 is a block diagram of the method used to implement an industrial energy recovery system. The system uses software code stored in controller 90 to calculate speed targets of first VFD 70 for exhaust gases fan 60 and of second VFD 105 for heat source liquid circulating pump 95 which will maximize the generated power and maintain the process temperatures and flows within the design parameters of the components of the system. The temperature of the exhaust gases and the corresponding flow are a direct result of the fuel consumption of furnace 10. When the furnace changes from idle to full load operation or vice versa, there is a time delay before the temperature of the exhaust gases reaches the steady state temperature. This information is included in the model that calculates the temperature target T* for the heat source liquid. This temperature target T*, the corresponding temperature feedback of the heat source liquid Tho obtained from temperature sensor 80 located at the outlet of heat exchanger 55 and the flow of the heat source liquid, which is calculated from the speed target n* of second VFD 105 for heat source liquid circulating pump 95, are used to calculate the speed target of first VFD 70 for exhaust gases fan 60. Furnace controller 40 can provide furnace fuel consumption data, Fuel_C. If so, that data is retrieved and transmitted to controller 90 at 305. A determination is made at 300 whether furnace 10 has been operating for a sufficiently long period of time. This data along with the initial target temperature T1* (a parameter stored in controller 90) are used to calculate the optimum heat source liquid target temperature at 310 using the formula $T^*=K0(Thg, Fuel\_C)+T1^*$ in which $T^*$ is the optimum target temperature for the heat source liquid, K0(Thg.Fuel_C) is an interpolation block or a function having as input variables the temperature feedback of hot gases entering the system (Thg.) and the furnace fuel consumption (Fuel_C) which may or may not be available, and $T1^*$ is the heat source liquid initial target temperature T1* stored as a parameter in controller 90. As the temperature of the gases or fuel consumption rise, KO will assume higher values until it reaches a preset limit. If either the furnace fuel consumption data or temperature feedback of hot gases entering the system (Thg) or both are not available, K0 will be simplified accordingly. If furnace 10 fuel consumption data is not available, then the optimal temperature T* is calculated at 320 based on the formula $T^*=K0(Thg)+T1^*$. Using the calculated optimal temperature, T*, the desired speed feed forward command of first VFD 70 for exhaust gases fan 60 is further calculated at 325 using the formula $F^*ff=K1(T^*,n^*)$ where F*ff is the exhaust gases fan speed expressed as a feed-forward command and K1(T*,n*) is obtained from an interpolation block or function having as input variables the calculated optimal heat source liquid temperature, T* and the target speed reference n* for second VFD 105 of heat source liquid circulating pump 95. The amount of the speed adjustment is calculated at 335 according to the formula $F^*c=(Kp+Ki/s)\cdot(T^*-Tho)$ where F*c is the exhaust gases fan speed target compensation, Tho is the heat source liquid temperature as measured by second sensor 80 of liquid leaving heat exchanger 55 and Kp and Ki are the proportional and integral gains of the exhaust gases fan speed regulator which correspond to a typical proportional and integral (PI) regulator although other types of regulators may also be used for this purpose. The term 1/s is an operator known in the art that corresponds to an integrator and is derived from applying the Laplace transformation to the solution of differential equations. After the compensation F*c is calculated, the target speed F* of first VFD 70 for exhaust gases fan 60 is set at 340 according to the formula $F^*=F^*ff+F^*c$, and the maximum allowable speed F*max of first VFD 70 for exhaust gases fan 60 is calculated according to the formula $F^*max=K2(T^*,P,Pr)$ where F*max is the maximum allowable fan speed reference of the VFD 70 and K2(T*,P,Pr) is an interpolation block or function having as input variables the heat source liquid target temperature T*, the output power feedback of the ORC system in kilowatts P as measured by transducer 155 and a feedback signal from third sensor 125 representing the pressure Pr of the heat source liquid. The function K2 can be simplified in case the P or Pr variables are not available. It is desirable to know F*max in order to avoid running the exhaust gases fan at an excessive speed and to prevent excessive heat source liquid pressure in the system. A comparison of F* with F*max at 350 establishes whether the exhaust fan speed target is too high. If so, the exhaust gas fan speed target is adjusted at 355 so that F*=F*max. Afterwards, processing continues at 360 where the speed target n* of second VFD 105 for heat source liquid circulating pump 95 is calculated according to the formula $n^*=K3(T^*,Tc)+n1^*$ where K3(T*, Tc) is obtained from an interpolation block or a function based on the input variables T*, for heat source liquid target temperature at the outlet of the heat exchanger as calculated at 310 and Tc for the temperature of the ORC system cooling fluid based on a feedback signal from fourth sensor 165 and where n1* is the base speed target of second VFD 105 for heat source liquid circulating pump 95. When the ORC cooling fluid temperature and/or the target temperature of the liquid heat source liquid change, K3 will change in order to maintain the power generated and the efficiency of the ORC system 130 at the maximum possible values. The maximum allowed speed target of second VFD 105 for heat source liquid circulating pump 95 is calculated at 365 according to the formula $n^*max=K4(P)$ where K4(P) is an interpolation block or a function for which the only input variable is the output power of ORC 130 as measured at transducer 155. If the target pump speed n* exceeds the maximum permissible pump speed n*max as determined at 370, a limit is imposed on the speed target of second VFD 105 for circulating pump 95 at 375 to reduce that speed. This method represents a control loop which is in constant use when the furnace is running.

Figure 4:
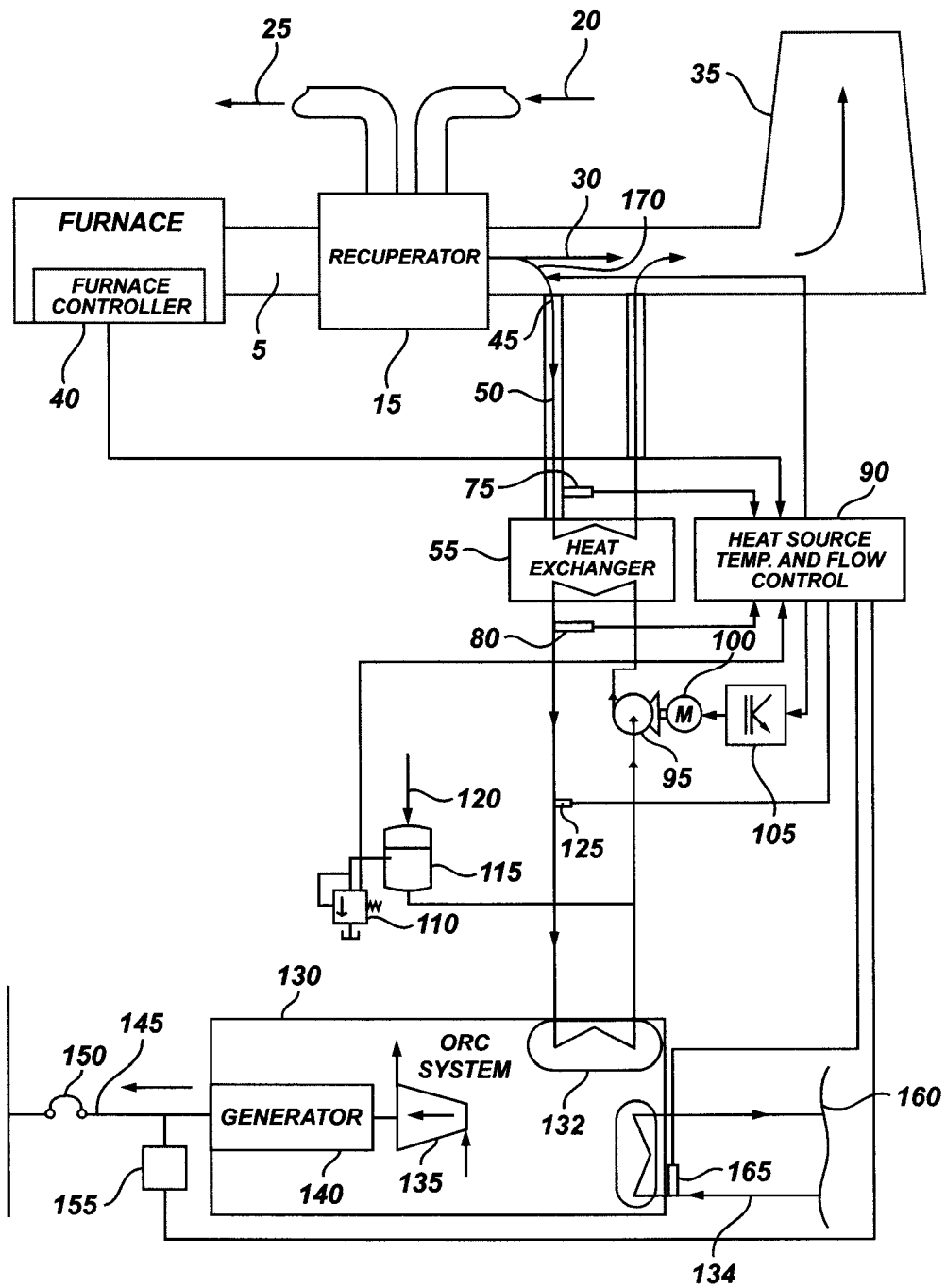
FIG. 4 is a schematic diagram of an alternative arrangement showing the main elements of an industrial energy recovery system.

In FIG. 4, an alternative arrangement of the functional elements of the system of this invention is presented in a schematic diagram form. In this arrangement, exhaust gasses fan 60, first electric motor 65 and first variable frequency drive 70 are eliminated. Instead, valve 170 is incorporated at exhaust gas tap 45 where a portion of the exhaust gases exiting recuperator 15 are first diverted into the energy recovery system, heat exchanger 55. Valve 170 is regulated by controller 90 so as to change the flow of exhaust gases into the energy recovery system in a manner similar to that described above for providing a fan speed target of VFD 70 for exhaust gases fan 60.

The foregoing invention has been described in terms of a preferred embodiment. However, it will be apparent to those skilled in the art that various modifications and variations can be made to the disclosed apparatus and method without departing from the scope or spirit of the invention and that this invention has applicability to many other industrial processes besides steel manufacturing in which hot exhaust gases are produced, such as, for example, cement plants and power generation. The specification and examples are exemplary only, while the true scope of the invention is defined by the following claims.

What is claimed is:

1. A system for converting excess energy generated as a byproduct of a fuel-powered industrial process in the form of heated exhaust gases directed to an exhaust structure into electrical energy comprising:
   a heat exchanger having a gas input and a gas output, each connected to an exhaust structure, and having further a heat source liquid input and a heat source liquid output;
   a tap connected with the exhaust structure and the heat exchanger and comprising a tap input and a tap output such that during use:
   (i) a first stream of gas in the exhaust structure flows from a location upstream of the tap input to a location that is both downstream of the tap input and upstream of the tap output, and then flows from the location upstream of the tap output to a location downstream of the tap output;
   (ii) a second stream of gas flows through the tap input and into the tap, then through the gas input and into the heat exchanger, then through the gas output and the tap output and back into the exhaust structure and the first stream of gas; an organic Rankine cycle (ORC) system having a first input connected to the heat source liquid output of said heat exchanger and a first output connected to the heat source liquid input of said heat exchanger, said ORC system further having a generator delivering electric power to a second output of said ORC system;

a fan for regulating the temperature of the liquid heat source by changing the amount of gases circulated between the exhaust structure and the gas input and the gas output of said heat exchanger, wherein speed of the fan is based in part on a heat source liquid target temperature, which is calculated by software in a first controller and is calculated based on a function having as input variables: (a) monitored fuel consumption data of the fuel-powered industrial process, (b) a temperature feedback of heated gases entering the gas input of the heat exchanger, and (c) an initial liquid heat source target temperature; and heat source liquid circulator for regulating the heat transfer to said ORC by changing the amount of liquid circulated between said ORC and said heat exchanger.

2. The system of claim 1 wherein the fan comprises:
an exhaust gases fan connected to a vent;
a first electric motor connected to said exhaust gases fan; and
a first variable frequency drive connected to said first electric motor;
wherein the first controller is connected to said first variable frequency drive for monitoring and regulating said first variable frequency drive.

3. The system of claim 2 wherein the fan further comprises:
second controller connected to said first controller for monitoring fuel consumption data of the industrial process and transmitting that data to said first controller;
first sensor connected to the gas input of said heat exchanger for measuring the temperature of the exhaust gases at that point and for transmitting that data to said first controller;
second sensor connected to the heat source liquid output of said heat exchanger for measuring the temperature of the liquid at that point and for transmitting that data to said first controller;
third sensor connected to the heat source liquid output of said heat exchanger for measuring the pressure of the heat source liquid at that point and for transmitting that data to said first controller; and
a protective power transducer connected between the second output of said ORC system and said first controller.

4. The system of claim 3 wherein said heat source liquid circulator comprises:
a pressurized heat source liquid expansion tank;
a pressure relief valve connected to said expansion tank and to said first controller;
a variable speed circulating pump connected at its input to said expansion tank and at its output to the heat source liquid input of said heat exchanger;
a second electric motor connected to said pump;
a second variable frequency drive connected to said second electric motor; and
fourth sensor connected to said ORC for measuring the temperature of the cooling medium used by said ORC, and wherein further said second variable frequency drive is further connected to said first controller.

5. The system of claim 3 wherein said heat source liquid circulator comprises:
a pressurized heat source liquid expansion tank;
a pressure relief valve connected to said expansion tank and to said first controller;
a fixed speed circulating pump connected at its input to said expansion tank and at its output to the heat source liquid input of said heat exchanger; and
a second electric motor connected to said pump.

6. A method for regulating the generation of electrical power from heated waste gases emitted from a fuel-powered industrial device into an exhaust structure using a heat exchanger having a gas input connected to the exhaust structure and a gas output connected to a variable speed exhaust fan which is itself connected to the exhaust structure and having further an organic Rankine cycle device (ORC) with an evaporator having a heat source liquid input connected to a liquid output of the heat exchanger and a heat source liquid output connected to a pressurized source of liquid further connected to a pump and thereafter to a liquid input of the heat exchanger wherein the ORC incorporates an expander coupled to a generator having an electrical output connected to a transducer comprising:

diverting a portion of the waste gases away from the exhaust structure into the gas input of the heat exchanger through a tap in communication with the exhaust structure and the heat exchanger such that during use:
(i) a first stream of gas in the exhaust structure flows from a location upstream of an input to the tap to a location that is both downstream of the input to the tap and upstream of an output to the tap, then flows to a location downstream of the output to the tap, and
(ii) a second stream of gas flows through the tap input and into the tap, then through the gas input and into the heat exchanger, then through the tap output and back into the exhaust structure and the first stream of gas;

regulating through a first controller the heat source liquid temperature by changing the amount of the waste gases so diverted by varying the speed of the exhaust fan, wherein the speed of the fan is based in part on a heat source liquid target temperature, which is calculated by software in the first controller and is calculated based on a function having as input variables: (a) monitored fuel consumption data of the fuel-powered industrial process, (b) a temperature feedback of heated gases entering the gas input of the heat exchanger, and (c) an initial liquid heat source target temperature;

controlling through the first controller the amount of heat transferred from the heat source liquid to the ORC by changing the flow of the liquid circulated between the ORC and the heat exchanger by managing the operation of the pump; and monitoring at the transducer the amount of electricity generated by the generator at the electrical output.

7. A method for regulating the production of electrical power from heated waste gases generated as a byproduct of a fuel-powered industrial device comprising:

providing waste gases as a first stream of gas and diverting a part of the first stream of gas at a temperature measured by a first sensor as a second stream of gas through a tap input and into a tap connected with an exhaust structure, then through a gas input and into a heat exchanger before being expelled from a gas output of the heat exchanger through a tap output and back into the exhaust structure, such that the first stream of gas flows from a location upstream of the tap input to a location that is both downstream of the tap input and upstream of the tap output, and then flows from the location upstream of the tap output to a location downstream of the tap output;

regulating the circulation of the waste gases through the heat exchanger by an exhaust gases fan driven by a first electric motor the speed of which is controlled by a first variable frequency drive (VFD) itself further controlled by a first controller incorporating a Proportional-Integral regulator, said first controller being connected to a second controller further connected to the fuel-powered device for monitoring fuel consumption and to the first sensor and wherein further a heat source liquid is delivered to a liquid input of the heat exchanger before being expelled from a liquid output of the heat exchanger into a heat source liquid circuit at a temperature measured by a second sensor and a pressure measured by a third sensor both of which sensors being connected to the first controller;

regulating the circulation of the heat source liquid through the heat exchanger by a pump driven by a second electric motor the speed of which is controlled by a second variable frequency drive (VFD) itself further controlled by the first controller, while the heat source liquid pump inlet is also connected to a liquid expansion tank subject to pressurization with inert gas, the pressure of which is monitored by the third sensor, the expansion tank also including a pressure relief valve monitored by the first controller, the heat source liquid expelled from the liquid output being then directed through an evaporator located in an organic Rankine cycle (ORC) system incorporating a heat sink circuit having a fourth sensor connected to the first controller for measuring the temperature of the ORC cooling medium, an expander connected to a generator and a power transducer connected between the generator and the first controller;

calculating an optimum target temperature for the heat source liquid based on a function having as input variables: (a) monitored fuel consumption data of the fuel-powered industrial process, (b) a temperature feedback of heated gases entering the gas input of the heat exchanger, and (c) an initial liquid heat source target temperature;

further calculating a desired speed feed forward command for the first variable frequency drive;

yet further calculating a speed adjustment;

setting the target speed of the first variable frequency drive;

further setting the maximum allowable speed of the first variable frequency drive;

limiting the exhaust fan speed or calculating the target speed for the second variable frequency drive;

further determining the maximum allowable speed for the second VFD and when appropriate limiting the pump speed.

8. The system of claim 1, further comprising:
a first variable frequency drive operably connected to the fan, wherein the first variable frequency drive is configured for regulating speed of the fan; and
a second variable frequency drive operably connected to the heat source liquid circulator, wherein the second variable frequency drive is configured for regulating speed of the heat source liquid circulator.

9. The system of claim 8, further comprising:
a first sensor for measuring temperature of gases in the tap;
a second sensor for measuring temperature of the heat source liquid;
wherein the first controller is configured for receiving an input from the first sensor and an input from the second sensor and for sending a first command to the first variable frequency drive and a second command to the second variable frequency drive based on the input from the first sensor and the input from the second sensor;
wherein the first command is for changing speed of the first variable frequency drive, thereby regulating the speed of the fan and an amount of gas moving through the tap during use; and
wherein the second command is for changing speed of the second variable frequency drive, thereby regulating the speed of the heat source liquid circulator during use.

10. The system of claim 9, further comprising:
a third sensor, which is a pressure sensor, for measuring pressure of the heat source liquid, wherein during use the first controller is capable of receiving input from the pressure sensor, such that if the input from the pressure sensor exceeds a threshold, the speed of the first variable speed drive is reduced thereby slowing the amount of gases moving through the tap.

11. The system of claim 10 further comprising a heat sink circuit for circulating a cooling medium and a fourth sensor for measuring temperature of the cooling medium.

12. The system of claim 11, wherein during use the first controller is capable of receiving an input from the fourth sensor for calculating a reference for the second variable frequency drive to regulate the speed of the heat source liquid circulator.

13. The system of claim 12, further comprising a second controller which during use is capable of providing data to the first controller on fuel-consumption rate of a fuel-powered device to which the exhaust structure is part of.

14. The system of claim 2, further comprising an electric power transducer for monitoring an electric power output of the ORC system and for transmitting the electric power output to the first controller.

15. The system of claim 14, wherein the first controller is configured to send a command to the first variable frequency drive to reduce the speed or stop operation of the fan in response to excess electric power output of the ORC system.

* * * * *